(12) United States Patent
Lui et al.

(10) Patent No.: US 7,450,670 B2
(45) Date of Patent: Nov. 11, 2008

(54) AUTOMATIC GAIN CONTROL 16-ARY QUADRATURE AMPLITUDE MODULATION SUBSYSTEM

(75) Inventors: Gee L. Lui, Westminster, CA (US); Kuang Tsai, Santa Ana, CA (US); Milton K. Sue, San Gabriel, CA (US)

(73) Assignee: The Aerospace Corporation, El Segundo, CA (US)

( * ) Notice: Subject to any disclaimer, the term of this patent is extended or adjusted under 35 U.S.C. 154(b) by 600 days.

(21) Appl. No.: 11/153,629

(22) Filed: Jun. 14, 2005

(65) Prior Publication Data

US 2006/0280267 A1 Dec. 14, 2006

(51) Int. Cl.
  *H04L 27/08* (2006.01)
(52) U.S. Cl. ............ 375/345; 341/348; 341/325; 341/350; 341/351; 455/63; 455/114; 455/136; 455/138
(58) Field of Classification Search ............ 375/345, 375/323, 262, 261, 348, 325, 350, 351; 455/63, 455/114, 136, 138
See application file for complete search history.

(56) References Cited

U.S. PATENT DOCUMENTS 4,835,483 A * 5/1989 Matsuura ............... 329/310
5,636,252 A * 6/1997 Patel et al. ............ 375/345
7,120,208 B1 * 10/2006 Nayler ................... 375/345

* cited by examiner

*Primary Examiner*—Chieh M. Fan
*Assistant Examiner*—Eva Puente
(74) *Attorney, Agent, or Firm*—Derrick Michael Reid

(57) ABSTRACT

An improved AGC subsystem for preferred use in quadrature amplitude modulation receivers offers improved automatic gain control of received signals in fading channels by generating an error signal only from constellation signal points having large signal-to-noise ratios for increase the signal-to-noise ratio of the gain control error signal for lowering dispersion of symbol signals in the constellation signal space for improving data detection of symbol signals with the improved performance with as much as one dB in the signal-to-noise ratio.

8 Claims, 4 Drawing Sheets

ERROR DETECTOR

AGC 16-QAM SUBSYSTEM (PRIOR ART)

ERROR DETECTOR

16-QAM SIGNAL CONSTELLATION

16-QAM AGC SUBSYSTEM PERFORMANCE

AUTOMATIC GAIN CONTROL 16-ARY QUADRATURE AMPLITUDE MODULATION SUBSYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of quadrature amplitude modulation communication systems. More particularly, the present invention relates to automatic gain control of received signals in quadrature amplitude modulation communication systems.

BACKGROUND OF THE INVENTION

In a digital data transmission system employing amplitude and phase modulation, such as the 16-ary quadrature amplitude modulation (16-QAM), the performance of a receiver is an essential receiver function. Automatic gain control (AGC) provides for uniform amplitude of the received signals across the signal constellation space. The more accurate the control of the amplitudes of the received signals, the better the demodulation performance of the demodulation of the received signals into data symbols. A 16-QAM AGC receiver has used a 16-QAM symbol demodulator in combination with an AGC error detector for AGC. Particularly, the prior 16-QAM AGC receiver subsystems have used average weights across the entire signal constellation space as constituents of the generated AGC error signal. However, power variability of the received signals in the signal constellation space can produce suboptimal AGC when all of the constellation points are averaged. These and other disadvantages are solved or reduced using the invention.

SUMMARY OF THE INVENTION

An object of the invention is to provide a subsystem for automatic gain control of received signals.

Another object of the invention is to provide a subsystem for automatic gain control of received signals over a constellation signal space.

Yet another object of the invention is to provide a subsystem for automatic gain control of received signals over a constellation signal space using weighted perimeter constellation points in the constellation signal space.

Still another object of the invention is to provide a subsystem for automatic gain control of received signals over a constellation signal space by weighted perimeter constellation points in the constellation signal space for quadrature amplitude modulated signals.

A further object of the invention is to provide a subsystem for automatic gain control of received signals over a constellation signal space by weighted perimeter constellation points in the constellation signal space for 16-ary quadrature amplitude modulated signals.

The invention is directed to a baseband automatic gain control (AGC) subsystem in a receiver for receiving M-ary quadrature amplitude modulated (QAM) signals, such as 16-ary QAM signals. The subsystem provides improved AGC control performance. The subsystem tracks large signal to noise ratio (SNR) signals as a subset of all of the signals in the constellation space. That is, the AGC tracks the amplitude of large SNR signals, preferably on the perimeters of points in the constellation space. In the constellation space, those received inner symbol signals, particularly those proximal to the zero-zero volt origin in the constellation space, have low SNRs. The low SNR symbol signal are not used in the AGC, but, those received outer signals distal to the zero-zero volt origin and preferably on the perimeter in the constellation space having large SNRs are used for AGC. Those outer signals with large SNRs provide a better indication of the amount of AGC needed to provide uniform automatic amplitude gain control for improved reception of all of the signals in the constellation space. A demodulator in the receiver operating in conjunction with the outer large SNR AGC subsystem can provide improved performance with up to 1.0 dB in SNR, over an AGC subsystem averaging all of the amplitudes of all of the received signals in the constellation space. The use of only large SNR signals by the subsystem can be implemented by modest modifications to an AGC error detector in a conventional AGC design. These and other advantages will become more apparent from the following detailed description of the preferred embodiment.

DETAILED DESCRIPTION OF THE PREFERRED EMBODIMENT

Figure 1:
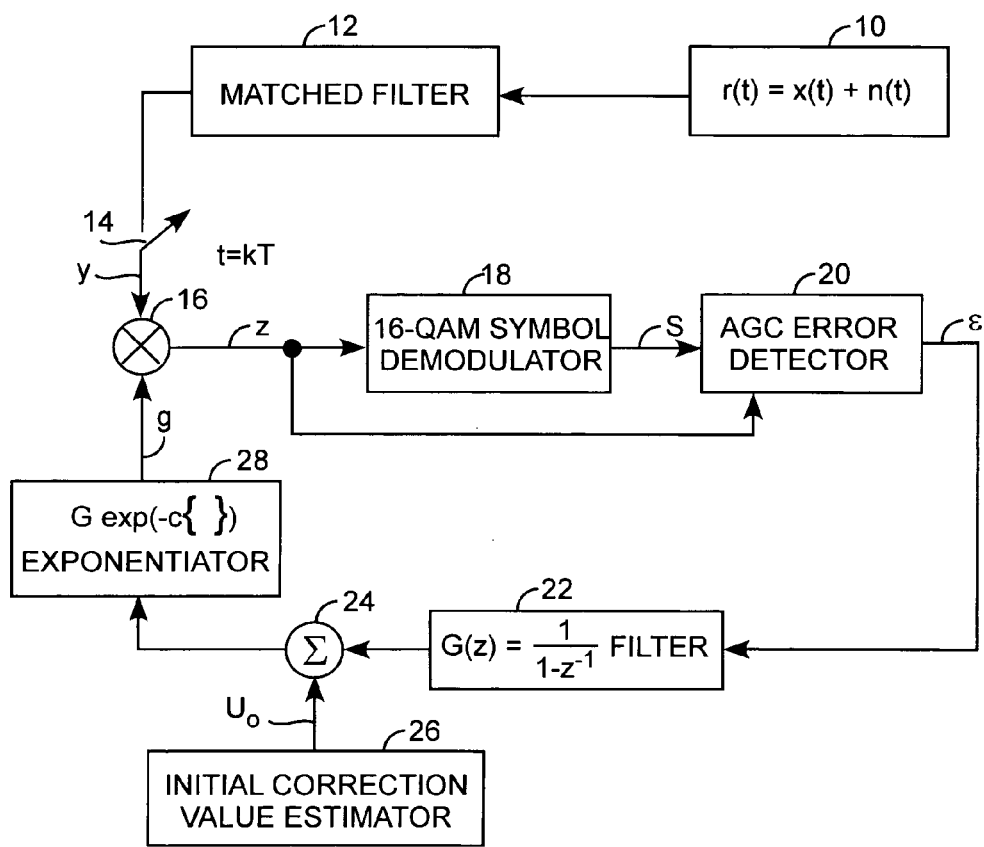
FIG. 1 is a block diagram of a prior art automatic gain control 16-ary quadrature amplitude modulated subsystem.

An embodiment of the invention is described with reference to the figures using reference designations as shown in the figures. Referring to FIG. 1, a conventional 16-ary quadrature amplitude modulated subsystem receives an r(t) received baseband signal 10 filtered by a matched filter 12 for phase amplitude modulation filtering of the received signal 10 for providing Y match filter signals that are then sampled by a sampler 14 for providing Y sampled signals to a mixer 16. The mixer 16 adjusts the Y sampled signals by a gain control signal g from an exponentiator 28 for providing a gain-adjusted Z baseband signal. The Z baseband signal is then fed into a quadrature amplitude modulated (QAM) demodulator 18 that is preferably a 16-QAM demodulator, for providing a constellation space S demodulated signals that are then fed into an AGC error detector 20 for providing an $\epsilon$ error signal. The detector 20 also receives the Z baseband signal for generating the $\epsilon$ error signal. The $\epsilon$ error signal is then fed into a G(Z) gain filter 22 for providing an error filter signal. An initial correction value estimator 26 provides an initial correction value $U_o$ that is summed by a summer 24 for adding the initial correction value $U_o$ to the error filter signal for providing a correction signal. The correction signal is fed into the exponentiator 28 for generating the gain control signal g. The matched filter 12 is matched to the impulse response of a data pulse shaping filter employed in a transmitter, not shown, transmitting the received signal, as is all well known. The terms G and c are the AGC subsystem parameters and $U_0$ is the initial correction value obtained by an estimation of the received averaged signal power of the matched filter output samples. A parameter $P_{av}$ refers to the average signal power of the reference signal constellation that is used by the data symbol demodulator 18.

The received r(t) baseband signal 10 with additive noise is filtered by the matched filter 12 and the output of the matched filter is sampled at symbol times t=kT. Each matched filter output Y is multiplied by the gain factor g to compensate for the signal amplitude variation caused by channel disturbances, such as fading. The gain factor g is initialized to the initial correction value that can be determined by the average signal power estimate of the matched filter output samples. The complex product Z=gy is applied to the symbol demodulator 18 that then makes a data symbol decision S according to the minimum Euclidean distances criterion. The symbol decision of the demodulator 18 is an assignment of a received signal Z to a nearest one of the predetermined S signal points in the constellation space. The demodulator 18 will produce S signals at predetermined points in the constellation space from respective received signals Z. With the Z and S signals, the AGC error detector 20 computes the $\epsilon$ error signal based only on the outer ring perimeter signals having large signal-to-noise ratios. The $\epsilon$ error signal is generated using the large signal-to-noise ratio outer ring S signals within the constellation space. As such, the AGC subsystem has an improved AGC error signal detector 20 that produces less noisy error signals using improved error detection. The improvement of the AGC 16-QAM subsystem resides in the AGC error detector 10.

Figure 2:
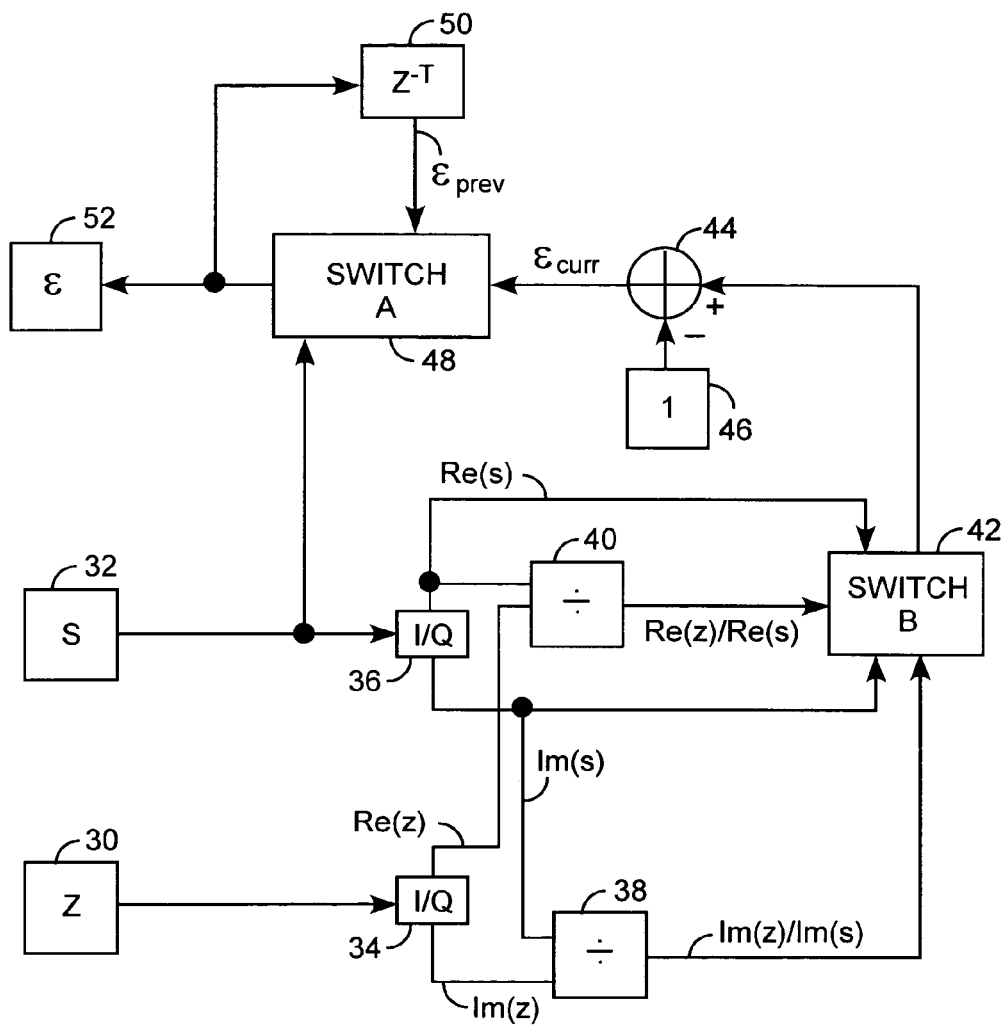
FIG. 2 is a block diagram of an improved error detector.
Figure 3:
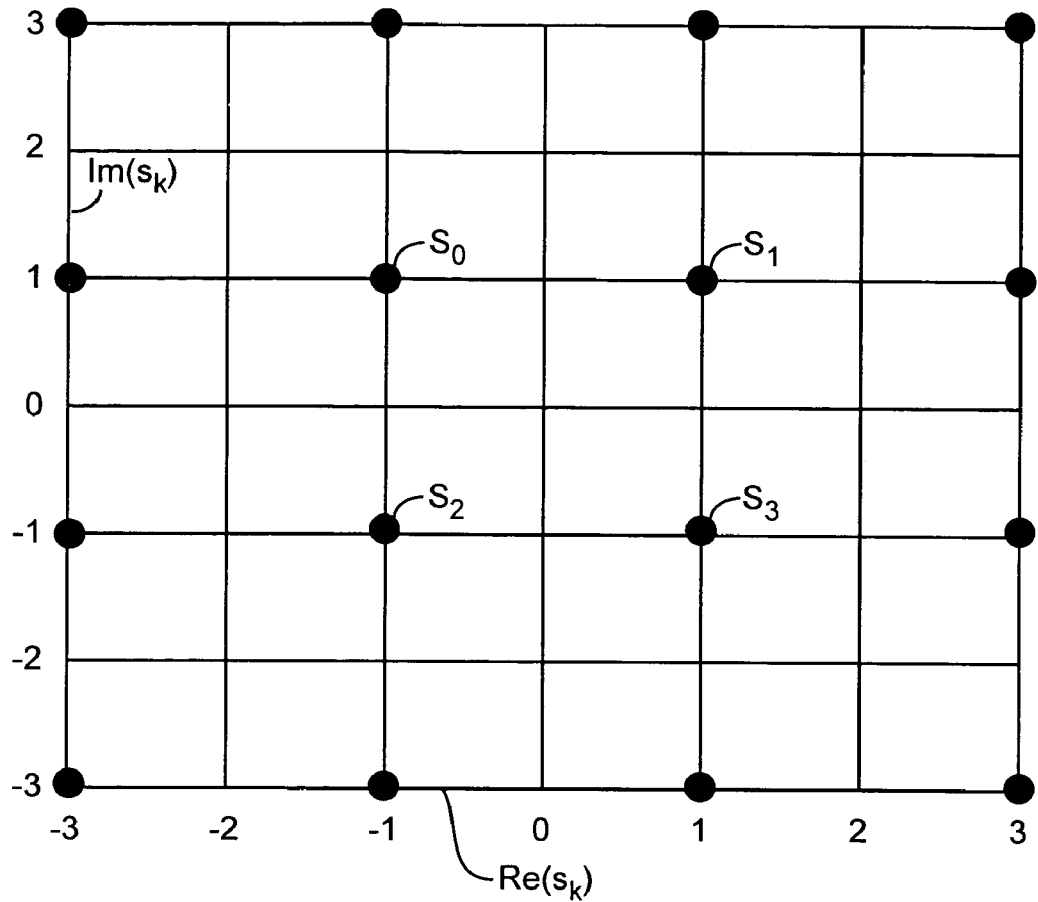
FIG. 3 is a graph of 16-ary constellation signal space.

Referring to FIGS. 1, 2, and 3, and more particularly to FIGS. 2 and 3, the improvement in the AGC 16-QAM subsystem resides in the AGC error detector 20 for generating error signal based on received signals having large SNRs. The AGC error detector 20 is improved by generating the $\epsilon$ error signal from the demodulated S signals and the received Z signals preferably using only outer ring signals. The outer ring S signals for a perimeter in the constellation space. The improved AGC error detector 20 in an AGC 16-QAM subsystem relies on maintaining gain control based on the magnitudes of the outer ring received constellation signals. The received signals on or near the outer ring of the 16-QAM signal constellation space have higher signal-to-noise ratios than received signals on or near the inner ring signals. That is, the twelve outer ring signals have larger magnitudes for both the inphase or quadrature components than the four inner ring signals, S0, S1, S2, and S4. The error detector 20 produces the $\epsilon$ error signal having high signal-to-noise ratios for improved gain control. The $\epsilon$ error signal derived from only signals having high SNRs signal improves the gain control as consequently tracking of the received signals for improved demodulator performance.

In the error detector 20, the received Z baseband signal 30 and the S demodulated symbol signal 32, indexed by an index k, are respectively fed into I/Q filters 34 and 36. The I/Q filter 34 generates an Re(S) signal and an Im(S) signal. The Re(S) signal is the magnitude of the real part of the complex symbol signal S. The Im(S) signal is the magnitude of the imaginary part of the complex symbol signal S. The I/Q filter 36 generates an Re(Z) signal and an Im(Z) signal. The Re(Z) signal is the magnitude of the real part of the complex received signal Z. The Im(S) signal is the magnitude of the imaginary part of the complex received signal Z. The magnitudes of the real and imaginary parts of the complex symbol and received signals S and Z provide an indication of SNR of the signals.

A divider 38 divides the Im(Z) signal by the Im(S) for producing an imaginary ratio signal Im(Z)/Im(S). A divider 40 divides the Re(Z) signal by the Im(Z) for producing a real ratio signal Re(Z)/Re(s). The Re(S) signal, the Im(S) signal, the Im(Z)/Im(S) ratio signal, and the Re(Z)/Re(s) are fed into a switch B. The switch B selects one of the two ratio signals Re(Z)/Re(s) and Im(Z)/Im(S) based on the magnitudes of either the real part Re(S) of the symbol signal S or the imaginary part Im(S) of the symbol signal. When the Re(S) magnitude of the real part of symbol signal S is greater than the Im(S) magnitude of the imaginary part of the symbol signal S, then the switch B selects the Re(Z)/Re(S) real ratio signal. When the Re(S) magnitude of the real part of symbol signal S is lesser than the Im(S) magnitude of the imaginary part of the symbol signal S, then the switch B selects the Im(Z)/Im(S) imaginary ratio signal. As such, the switch B selects a real or imaginary ratio based on the largest quadrature component of the symbol signal S. The selected real or imaginary ratio signal is then normalized by a one value 46 using a summer 44 so as to provide a current error signal $\epsilon_{curr}$. The normalized current error signal $\epsilon_{curr}$ is normalized about a zero value using the normalization one value 46 and summer 44. The normalized one value 46 is subtracted from the selected ratio. The normalized current error signal $\epsilon_{curr}$ is a error signal centered at zero. The $\epsilon_{curr}$ signal is equal to the ratio of the received signal Z to the symbol signal S minus one. The selected ratio is either the imaginary Im(Z)/Im(S) ratio or the real Re(Z)/Re(s) ratio depending on which real or imaginary quadrature component of the S symbol signal is greater, so as to provide a current error signal $\epsilon_{curr}$ from the largest quadrature component of the symbol S signal.

Using the largest quadrature component of the symbol S signal provides the lowest SNR $\epsilon_{curr}$ signal. However, the current error signal $\epsilon_{curr}$ is based on the currently received Z and S signals. The current S signal may be either proximal or distal to the zero-zero origin in the constellation. The $\epsilon_{curr}$ signal based on a current S symbol signal proximal to the origin would have a lower SNR than a current S symbol signal proximal to the origin. When the $\epsilon_{curr}$ signal is based on a current S symbol signal that is proximal to the origin, the current error signal $\epsilon_{curr}$ is not used as the selected error signal $\epsilon$. When the $\epsilon_{curr}$ signal is based on a current S symbol signal that is distal to the origin, a previous error signal $\epsilon_{prev}$ signal is selected as the selected error signal $\epsilon$. The previous error signal $\epsilon_{prev}$ is always based on an S symbol signal that is distal to the origin in the constellation space. The distal S symbol signal is preferably an outer ring S signal on the perimeter of the constellation space having large SNRs.

The current S symbol signal is fed into an A switch 48 that is used to select either the $\epsilon_{curr}$ current error signal or the $\epsilon_{prev}$ previous error signal. A previously selected $\epsilon$ error signal 52 from the A switch 48 is fed into a time delay 50 for generating the previous error signal $\epsilon_{prev}$. The previous error signal $\epsilon_{prev}$ is the selected error signal delayed by one symbol time through delay 50. The A switch 48 determines when the current S symbol signal 32 is distal or proximal to the origin in the constellation space. This proximal or distal determination can be based on any criteria that segregates the constellation space into at least two sets of points, such as inner points and outer points. The proximal or distal determination can be based, for example, on the distance between the S symbol signal and the origin.

When the S symbol signal 32 is distal to the origin in the constellation space, and hence, has a large SNR, the current error signal $\epsilon_{curr}$ is selected as the selected error signal $\epsilon$ that then becomes the previous error signal $\epsilon_{prev}$ at the next symbol time. As long as the current S symbol signal remains distal to the origin with a high SNR, the current error signal $\epsilon_{curr}$ is selected as the selected error signal. The current error signal $\epsilon_{prev}$ is used as the selected error signal that then becomes the previous error signal $\epsilon_{prev}$ at the next symbol time. However, when the current S symbol signal 32 is proximal to the origin in the constellation space, and hence, has a small SNR, the previous error signal $\epsilon_{prev}$ is selected as the selected error signal ε that then remains the previous error signal $\epsilon_{prev}$ for the next symbol time. As long as the current S symbol signal remains proximal to the origin with a low SNR, the previous error signal is selected as the selected error signal so that the previous error signal $\epsilon_{prev}$ is used as the selected error signal. In so doing, the selected error signal ε is based on S symbol signals 32 having high SNRs, such as those in the outer ring on the perimeter of the constellation space. By generating an AGC error signal based only on high SNR S symbol signals distal to the origin in the constellation space, the selected error signal ε has less noise and the gain g is more precise. The selected error signal ε with less noise results in less noisy received signals fed into the symbol demodulator, for generating more accurate S symbol signals for improved data detection performance.

The preferred error detector can be applied to any M-ary QAM AGC subsystem. When the decided data symbol S is on the inner ring of the 16-QAM signal constellation, that is, inner ring signals $S_0$, $S_1$ $S_2$ $S_3$, the selected error signal is set to the previous error signal, which is initialized to zero. That is, signals on the inner ring with lower SNRs are expurgated from the error signal generation process in the AGC error detector 20. When the decided data symbol S is on the outer ring of the signal constellation and has a large SNR of either inphase and quadrature components, the outer ring S signal is used to set the selected error signal to the current error signal. The ε selected error signal is then used to compute the gain factor g for the next matched filter output sample.

Figure 4:
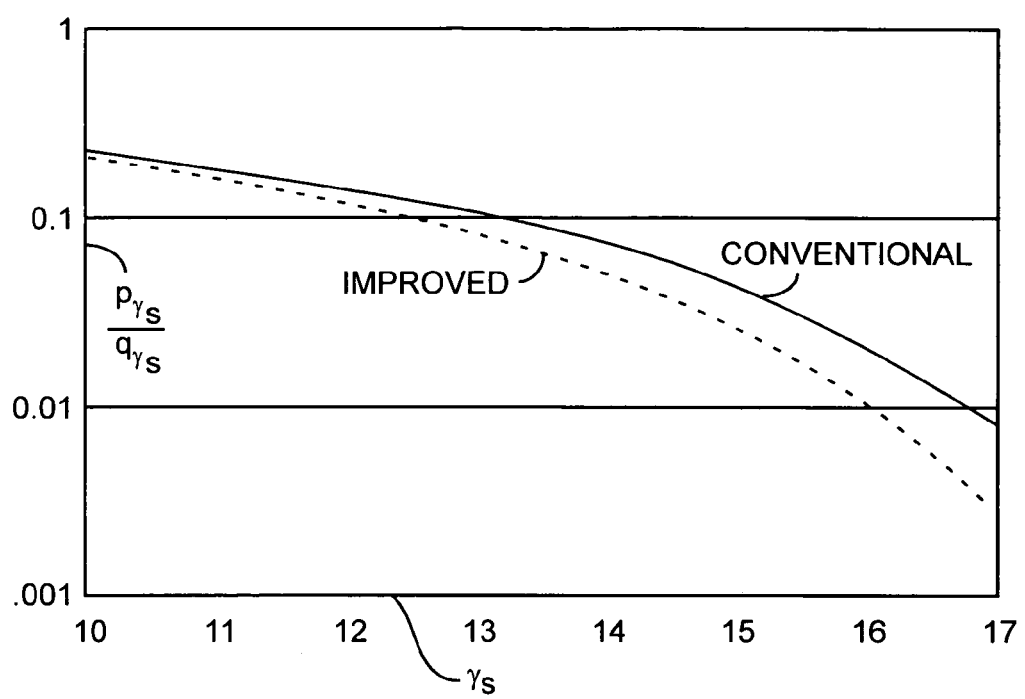
FIG. 4 is a graph of automatic gain control 16-ary quadrature amplitude modulated system performance.

Referring to all of the Figures, and particularly to FIG. 4, the improved 16-QAM AGC subsystem has improved performance over conventional 16-QAM AGC subsystems, with and without channel noise, respecting data symbol demodulation performance by observation of the resulting signal-to-noise ratio. The 16-QAM input signal constellation and data symbol demodulator 18 can be produced by conventional means with the improved error detector 20 with the absence of channel noise. The AGC subsystem parameters may be, for example, G=1000, c=0.1 and $U_0=\ln(G\sqrt{P_{AV}})/c$, where $P_{av}$ is the averaged signal power estimated over Y matched-filter output samples, for example, twenty-four matched filter output samples. The conventional AGC subsystem produces considerable amplitude dispersion in the 16-QAM signal constellation space, whereas virtually perfect gain control is achieved by the improved AGC subsystem. The 16-QAM input signal constellations are produced by the respective AGC subsystems for an averaged symbol energy-to-noise power density ratio of 14 dB. The 16-QAM signal constellation space resulted from the conventional AGC subsystem is more dispersive and noisier than the improved AGC subsystem. The demodulator symbol error probability performance for the respective AGC subsystems can be compared for signal-to-noise ratios ranges from 10 dB to 17 dB. The improved AGC subsystem performs uniformly better than that of the conventional AGC system. The improved AGC subsystem can have as much as 1.0 dB of demodulation performance advantage over the conventional AGC subsystem.

The invention is directed to an improved error detector in AGC M-ary QAM subsystem, such as in 16-ary QAM signal receiver. The error signal performs low SNR signal expurgation in a coherent amplitude error detection process to achieve an improved signal amplitude tracking performance over that of a conventional AGC subsystem that employs non-coherent error detection without weak signal expurgation. The error detector offers improved performance when using only high SNR S symbol signals for AGC. Various M-ary QAM subsystems can use an improved detector setting the AGC based on outer ring S symbols signals. The constellation space is divided into large and small SNR symbol points where only distal S symbol points are used to generate the selected error signal. Those skilled in the art can make enhancements, improvements, and modifications to the invention, and these enhancements, improvements, and modifications may nonetheless fall within the spirit and scope of the following claims.

What is claimed is:

1. An error detector for generating a selected error signal for automatic gain control of received signals that are gain adjusted in a quadrature amplitude modulation (QAM) subsystem having a symbol demodulator for demodulating the received signals into symbol signals within a constellation space, the error detector comprising,
   a first switch for generating a current error signal from a current received signal and from a current symbol signal, the current error signal being a normalized ratio of the current received signal divided by the current symbol signal, and
   a second switch for generating the selected error signal being either the current error signal at a current symbol time or a previous error signal at a previous symbol time, the previous error signal being a previous current error signal at a previous symbol time when a respective previous symbol signal is distal to an origin in the constellation space, the selected error signal being the previous error signal when the current symbol signal is proximal to the origin in the constellation space, the selected error signal being the current error signal when the current symbol signal is distal to the origin in the constellation space.

2. The error detector of claim 1 wherein the first switch comprises,
   a first filter for receiving the current symbol signal and for providing magnitudes of a real part of the current symbol signal and an imaginary part of the current symbol signal,
   a second filter for receiving the current received signal and for providing magnitudes of a real part of the current receive signal and an imaginary part of the current received signal,
   a first divider for dividing the magnitude of the real part of the current received signal by the magnitude of the real part of the current symbol signal for providing a real ratio,
   a second divider for dividing the magnitude of the imaginary part of the current received signal by the magnitude of the imaginary part of the current symbol signal for providing an imaginary ratio, and
   a selection mean for selecting the real ratio as the current error signal when magnitude of the real part of the current symbol signal is greater that the imaginary part of the current symbol signal and for selecting the imaginary ratio as the current error signal when magnitude of the imaginary part of the current symbol signal is greater that the real part of the current symbol signal.

3. The error detector of claim 1 wherein the first switch comprises,
   a first filter for receiving the current symbol signal and for providing magnitudes of a real part of the current symbol signal and an imaginary part of the current symbol signal,
   a second filter for receiving the current received signal and for providing magnitudes of a real part of the current receive signal and an imaginary part of the current received signal, a first divider for dividing the magnitude of the real part of the current received signal by the magnitude of the real part of the current symbol signal for providing a real ratio, a second divider for dividing the magnitude of the imaginary part of the current received signal by the magnitude of the imaginary part of the current symbol signal for providing an imaginary ratio, a selection mean for selecting the real ratio as the current error signal when magnitude of the real part of the current symbol signal is greater that the imaginary part of the current symbol signal and for selecting the imaginary ratio as the current error signal when magnitude of the imaginary part of the current symbol signal is greater that the real part of the current symbol signal, and a normalizer for normalizing the current error signal.

4. The error detector of claim 1 wherein the second switch comprises, a delay for delaying the selected error signal into the previous error signal, and a selector for selecting the previous error signal when the current symbol signal is proximal to the origin of the constellation space and for selecting the current error signal when the current symbol signal is distal to the origin of the constellation space.

5. The error detector of claim 1 wherein, the symbol signals in the constellation space are proximal in Euclidean distances to the origin of the constellation space and are closer in Euclidean distances than symbol signals distal to the origin of the constellation space.

6. The error detector of claim 1 wherein, the QAM subsystem is a 16-ary QAM subsystem, the constellation space comprises four inner symbol points proximal to the origin of the constellation space and comprises twelve outer symbol points distal to the origin of the constellation space.

7. The error detector of claim 1 wherein, the symbol signals in an inner ring have lower signal to noise ratios than the symbol signals in an outer ring in the constellation space.

8. The error detector of claim 1 wherein, the error detector disposed in an automatic gain control subsystem serves to reduced dispersion of the symbol signals in the constellation space.

* * * * *